(12) United States Patent
Dick et al.

(10) Patent No.: US 11,761,547 B1
(45) Date of Patent: Sep. 19, 2023

(54) VALVE ORIFICE INSERT

(71) Applicant: HORIBA STEC, Co., Ltd., Kyoto (JP)

(72) Inventors: John T. Dick, Reno, NV (US); David Daniel Webster, Reno, NV (US)

(73) Assignee: HORIBA STEC, Co., Ltd., Kyoto (JP)

( * ) Notice: Subject to any disclaimer, the term of this patent is extended or adjusted under 35 U.S.C. 154(b) by 0 days.

(21) Appl. No.: 17/658,431

(22) Filed: Apr. 7, 2022

(51) Int. Cl.
*F16K 7/14* (2006.01)
*F16K 1/42* (2006.01)
*F16K 27/02* (2006.01)
*F16K 11/02* (2006.01)

(52) U.S. Cl.
CPC ............... *F16K 7/14* (2013.01); *F16K 1/425* (2013.01); *F16K 11/022* (2013.01); *F16K 27/0236* (2013.01)

(58) Field of Classification Search
CPC ..... F16K 7/14; F16K 7/16; F16K 7/17; F16K 11/022; F16K 27/0236; F16K 1/42; F16K 1/425
See application file for complete search history.

(56) References Cited

U.S. PATENT DOCUMENTS

| | | | | |
|---|---|---|---|---|
| 1,493,784 A | * | 5/1924 | Larson | F16K 1/425 251/363 |
| 1,577,913 A | * | 3/1926 | Larson | F16K 1/425 251/363 |
| 2,198,238 A | * | 4/1940 | Adams | F16K 1/425 251/365 |
| 2,350,905 A | * | 6/1944 | Koehler | F16K 1/46 251/336 |
| 2,471,880 A | * | 5/1949 | MacDonald | F16K 1/425 251/365 |
| 4,395,050 A | * | 7/1983 | Wirz | F16K 1/2263 251/332 |
| 4,714,237 A | * | 12/1987 | Linderman | F16K 1/425 251/120 |

(Continued)

FOREIGN PATENT DOCUMENTS

| | | | |
|---|---|---|---|
| CH | 265932 A | * 12/1949 | |
| CN | 104089071 A | * 10/2014 | F16K 21/04 |

(Continued)

OTHER PUBLICATIONS

"Fractory"—Limits & Fits by Andreas Veiling, Fractory.com (https://fractory.com/limits-and-fits/) publicly available since Aug. 14, 2020, p. 1-10 (Year: 2020).*

(Continued)

*Primary Examiner* — David Colon-Morales
(74) *Attorney, Agent, or Firm* — Alleman Hall Creasman & Tuttle LLP

(57) ABSTRACT

A valve orifice insert has a stepped-shaped wall including a first tubular section and a second tubular section having a smaller outer dimension than the first tubular section, and a lip structure protruding axially and including a planar valve seat surface. The first tubular section and the second tubular section being are joined by a step structure. At least one circumferential protrusion extends radially outward a predetermined distance from an outer surface of the first tubular section or an outer surface of the second tubular section to form an interference fit with the step-shaped opening when the valve orifice insert is fitted into the step-shaped opening.

19 Claims, 12 Drawing Sheets

(56) References Cited

U.S. PATENT DOCUMENTS

| | | | | |
|---|---|---|---|---|
| 5,326,079 | A | * | 7/1994 | Ferrando ................ F16K 1/425 251/359 |
| 6,105,608 | A | * | 8/2000 | Katzman ................ F16K 7/17 251/35 |
| 6,786,471 | B2 | * | 9/2004 | Nakata ................ F16K 7/16 251/360 |
| 7,201,187 | B2 | * | 4/2007 | Irwin ................ F16K 31/365 251/210 |
| 7,686,280 | B2 | * | 3/2010 | Lowery ................ F16K 7/14 251/363 |
| 8,251,347 | B2 | * | 8/2012 | Schmit ................ F16K 7/16 251/335.2 |
| 8,322,684 | B2 | | 12/2012 | Otsuka et al. |
| 8,733,397 | B2 | | 5/2014 | Otsuka et al. |
| 8,844,901 | B2 | * | 9/2014 | Hayashi ................ F16K 25/00 251/360 |
| 9,863,542 | B2 | * | 1/2018 | Glime ................ C02F 1/325 |
| 10,364,897 | B2 | * | 7/2019 | Vu ................ F16K 1/54 |
| 10,458,553 | B1 | * | 10/2019 | Vu ................ F16K 1/54 |
| 11,248,708 | B2 | * | 2/2022 | Vu ................ F16K 1/44 |
| 11,306,830 | B2 | * | 4/2022 | Kondo ................ F16K 7/16 |
| 11,402,029 | B2 | * | 8/2022 | Sato ................ F16K 27/0236 |
| 2006/0011883 | A1 | * | 1/2006 | Martin ................ F16K 1/305 251/331 |
| 2007/0045587 | A1 | * | 3/2007 | Kolenc ................ F16K 1/425 251/331 |
| 2007/0145321 | A1 | | 6/2007 | Lowery |
| 2010/0243076 | A1 | * | 9/2010 | Hayashi ................ F16K 31/007 137/455 |
| 2014/0326915 | A1 | * | 11/2014 | Kitano ................ F16K 7/12 251/360 |
| 2018/0356845 | A1 | | 12/2018 | Yasuda et al. |
| 2021/0310565 | A1 | * | 10/2021 | Nakanishi ................ F01M 13/0011 |
| 2022/0136610 | A1 | * | 5/2022 | Glime, III ................ F16K 27/0236 251/335.2 |

FOREIGN PATENT DOCUMENTS

| | | | |
|---|---|---|---|
| DE | 582885 C | * | 8/1933 |
| DE | 627735 C | * | 3/1936 |
| DE | 102015209929 A1 | * | 12/2016 |
| JP | H11065671 A | | 3/1999 |
| JP | 2000213667 A | * | 8/2000 |
| JP | 2000213667 A | | 8/2000 |
| JP | 2010223364 A | | 10/2010 |
| KR | 20190053122 A | * | 5/2019 |

OTHER PUBLICATIONS

Peek, Material Safety Data Sheet Available at https://polymerplastics.com/images/msds_sheets/Peek.pdf, Website Available as Early as 2011, 2 pages.

Peek, Representative Website Available at https://www.curbellplastics.com/Research-Solutions/Materials/PEEK, Website Available as Early as 2016, 1 page.

ISA Japan Patent Office, International Search Report and Written Opinion Issued in PCT Application No. PCT/JP2023/004390, WIPO, May 9, 2023, 8 pages.

* cited by examiner

VALVE ORIFICE INSERT

BACKGROUND

Many conventional valves are operated by lowering or raising a diaphragm to close or open a valve orifice gap, respectively, to regulate the flow of fluid through the valve. In one type of conventional valve, the valve closes by making metal-to-metal contact between the diaphragm and the valve orifice. Even small misalignment in the surfaces making metal-to-metal contact can result in a poor seal and fluid leakage. Further as this type of valve ages, corrosion of the metal can make the metal-to-metal contact seal poorly and leak. Poor sealing and leakage degrade the quality of the manufacturing process in which the valve is being utilized. In another type of conventional valve described in U.S. Pat. No. 8,733,397, a resin part is sandwiched between two metal parts by compressive forces, and the resin part is contacted by a diaphragm to seal the orifice. While this avoids metal-to-metal contact between the diagram and sealing surface of the resin part, the integrity of the seal between the resin part and surrounding metal parts is at risk of degrading over time, resulting in fluid leakage or entrapment. Further, the sealing surface of the resin part may become misaligned at the time of manufacture or during use, and this misalignment can make it difficult to control very low flow rates. A degradation in the quality of seal such can negatively affect manufacturing processes that demand highly precise fluid flow control and low contamination levels, especially in the field of semiconductor manufacturing. These technical challenges have thus far stood as barriers to further advancements in valve design.

SUMMARY

According to one aspect of the present disclosure, a valve orifice insert is provided that is sized to be fitted in a step-shaped opening in an orifice structure of a valve assembly. The valve orifice insert comprises a plastic tubular body having a stepped-shaped wall including a first tubular section and a second tubular section having a smaller outer dimension than the first tubular section, the first tubular section and the second tubular section being joined by a step structure; and at least one circumferential protrusion extending radially outward a predetermined distance from an outer surface of the first tubular section or an outer surface of the second tubular section to form an interference fit with the step-shaped opening when the valve orifice insert is fitted into the step-shaped opening.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 12 is inserted into an orifice structure of the valve assembly in accordance with an example of the present disclosure.

DETAILED DESCRIPTION

Figure 1:
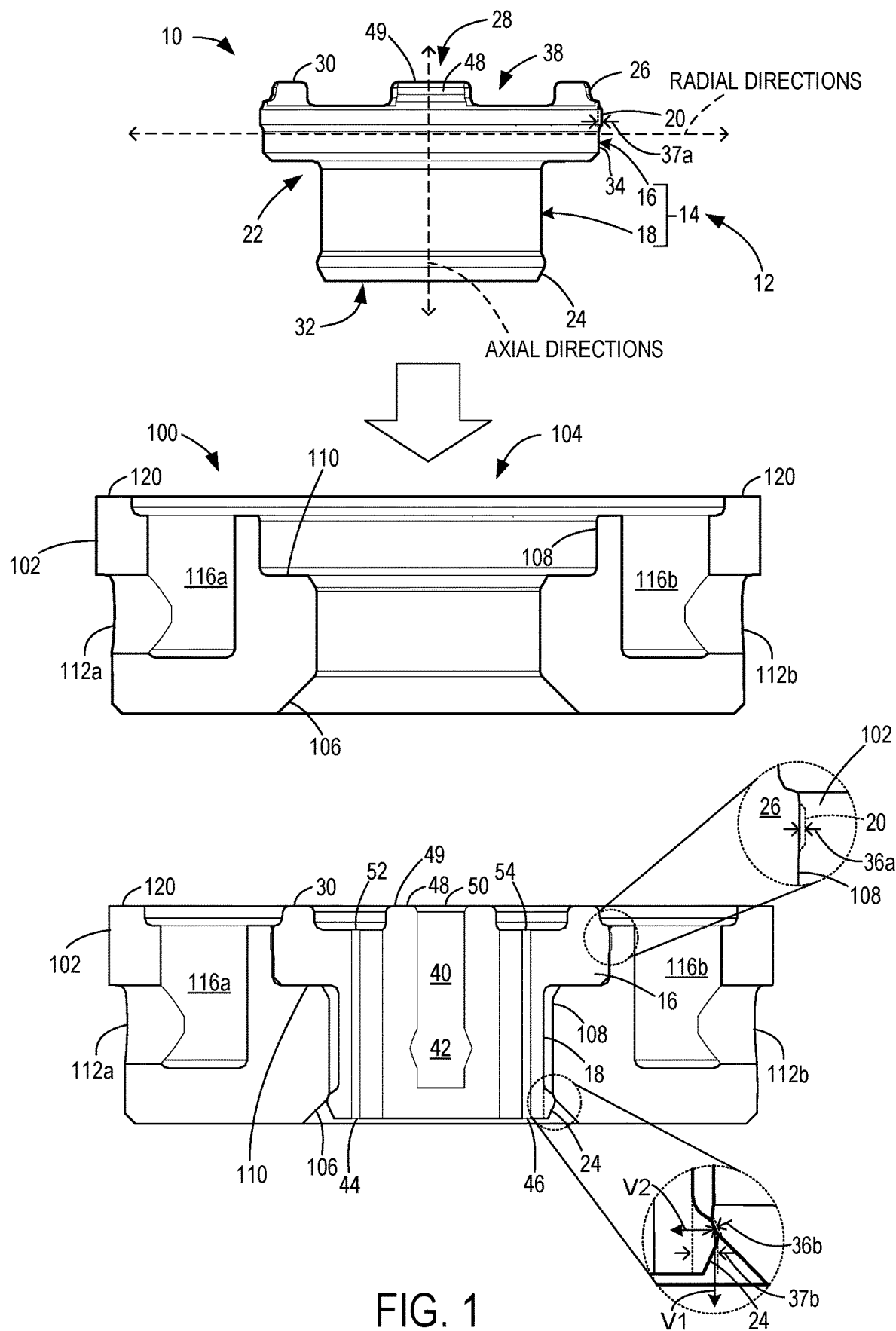
FIG. 1 shows a sectional view of a valve orifice insert fitted into an orifice structure of a valve assembly in accordance with a first example of the present disclosure.

In view of the above issues, referring to FIG. 1, a valve orifice insert 10 is sized to be fitted in a step-shaped opening 104 in an orifice structure 102 of a valve assembly 100 according to a first example of the present disclosure. The valve orifice insert 10 comprises a plastic tubular body 12 having a stepped-shaped wall 14 including a first tubular section 16 and a second tubular section 18 having a smaller outer dimension than the first tubular section 16. The first tubular section 16 and the second tubular section 18 are joined by a step structure 22. A first circumferential protrusion 20 extends radially outward a first predetermined distance 37a from an outer surface 34 of the first tubular section 16 form an interference fit with the step-shaped opening 104 when the valve orifice insert 10 is fitted into the step-shaped opening 104. A second circumferential protrusion 24 extends radially outward a second predetermined distance 37b from an outer surface of the second tubular section 18 to form an interference fit with the step-shaped opening 104 when the valve orifice insert 10 is fitted into the step-shaped opening 104. A first interference distance 36a of the interference fit between the first circumferential protrusion 20 and the step-shaped opening 104 and a second interference distance 36b of the interference fit between the second circumferential protrusion 24 and the step-shaped opening 104 may be 1/10000 to 1/100 of an inch, for example. It will be appreciated that the interference distance is the difference between the outer diameter of the first circumferential protrusion 20 and the inner diameter of the step-shaped opening 104 and also refers to the difference between the outer diameter of the second circumferential protrusion and the inner diameter of the stepped shaped opening.

It will be appreciated that the valve orifice insert 10 may be fabricated with different diameters of the first tubular section 16 and the second tubular section 18 to match orifice structures 102 with different orifice diameters.

The first tubular section 16 includes a lip structure 26 protruding axially from a first end 28 of the first tubular section 16 and includes a planar valve seat surface 30 formed at a distal end of the lip structure 26. The first tubular section 16 also includes an axially protruding central structure 48 with a central opening 50 for a central flow passage 40 extending axially to fluidically couple with a transverse flow passage 42 extending in a transverse direction within the valve orifice insert 10. A central planar valve seat surface 49 is formed at a distal end of the axially protruding central structure 48.

The space between the lip structure 26 and the central structure 48 forms a recessed cavity 38 which has a first side opening 52 for a first side flow passage 44 and a second side opening 54 for a second side flow passage 46. The first side flow passage 44 and the second side flow passage 46 extend axially within the valve orifice insert 10. The orifice structure 102 may include a first outlet 112a and a second outlet 112b opening to a first orifice flow passage 116a and a second orifice flow passage 116b of the orifice structure 102, respectively, which fluidically communicate with the space in the recessed cavity 38.

In cross-sectional views, FIG. 1 shows the valve orifice insert 10 being inserted into the step-shaped opening 104 of the orifice structure 102 such that after insertion, at least the first circumferential protrusion 20 extends radially outward a first predetermined distance 37a from an outer surface of the first tubular section 16, and the second circumferential protrusion 24 extends radially outward a second predetermined distance 37b from an outer surface of the second tubular section 18 to form an interference fit with the tapered surface 106 of the step-shaped opening 104. As the interference fit between the second circumferential protrusion 24 and the tapered surface 106 occurs at an angle relative to the axial direction of the insertion, the interference fit is enhanced by both axial compressive forces in an axial vector V1 and radial compressive forces in a radial vector V2 that act on the tapered surface 106. In particular, forces in the axial direction indicated by vector V1 promote the secure retention of insert in the step-shaped opening 104. The insertion of the valve orifice insert is stopped at a predetermined depth by the step structure 22. After insertion, the first tubular section 16 rests on the stepped surface 110 of the step-shaped opening 104, and the planar valve seat surface 30 formed at a distal end of the lip structure 26 is coplanar with an upper surface 120 of the orifice structure 102 and the central planar valve seat surface 49 formed at the distal end of the axially protruding central structure 48.

The first circumferential protrusion 20 is shaped as a ridge extending radially outward from the outer surface of the first tubular section 16, formed adjacent the first end 28 of the plastic tubular body 12. The interference fit compresses the first circumferential protrusion 20 the first predetermined distance 37a against a side wall 108 of the step-shaped opening 104, thereby effecting a seal, so that fluid within the valve orifice insert 10 does not leak out and become entrapped in the spaces between the valve orifice insert 10 and the orifice structure 102. The second circumferential protrusion 24 has a lobe shape, and extends radially outward from the outer surface of the second tubular section 18, formed adjacent a second end 32 of the plastic tubular body 12 opposite the first end 28 of the plastic tubular body 12.

The step-shaped opening 104 has a tapered surface 106 which tapers away from a second end 32 of the valve orifice insert 10 fitted into the step-shaped opening 104, and at least the second circumferential protrusion 24 contacts at least a portion of the tapered surface 106. The tapered surface 106 faces away from a surface of the step structure 22. As the valve orifice insert 10 is inserted into the step-shaped opening 104, the second circumferential protrusion 24 compresses and slides down towards the tapered surface 106. When the second circumferential protrusion 24 reaches the tapered surface 106, the second circumferential protrusion 24 springs out and contacts the tapered surface 106, thereby producing a seal and locking action. In other words, the interference fit compresses the second circumferential protrusion 24 the second predetermined distance 37b against the tapered surface 106, thereby effecting a seal and forming a locking mechanism to secure the valve orifice insert 10 within the step-shaped opening 104, so that fluid within the valve orifice insert 10 does not leak out and become entrapped in the spaces between the valve orifice insert 10 and the orifice structure 102.

The valve orifice insert 10 comprises an engineered-type plastic. The engineered-type plastic may be selected from the group consisting of polyetheretherketone (PEEK), polytetrafluoroethylene (PTFE), perfluoroalkoxy (PFA), and polychlorotrifluoroethylene (PCTFE). The engineered-type plastic is preferably PEEK plastic due to its compressibility, resilience, and flexibility.

Figure 2:
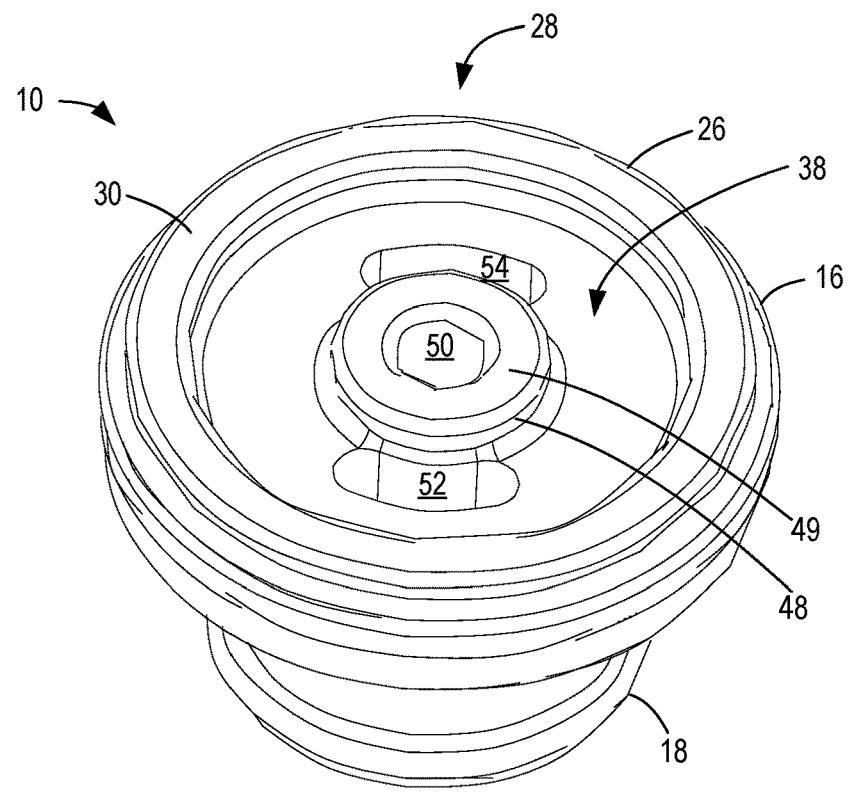
FIG. 2 shows a first perspective view of a valve orifice insert of FIG. 1 in accordance with the first example of the present disclosure.

Referring to FIG. 2, the valve orifice insert 10 according to the first example of the present disclosure is illustrated in a perspective view of the first end 28 of the valve orifice insert 10 and the distal end of the lip structure 26 of the first tubular section 16. The outer surface of the first tubular section 16 is cylindrical or conical. In this view, the recessed cavity 38 forms a ring around the central structure 48 and the central opening 50. The lip structure 26 forms a protruded ring surrounding the recessed cavity 38. The first side opening 52 and the second side opening 54 flank the central opening 50 within the recessed cavity 38.

Figure 3:
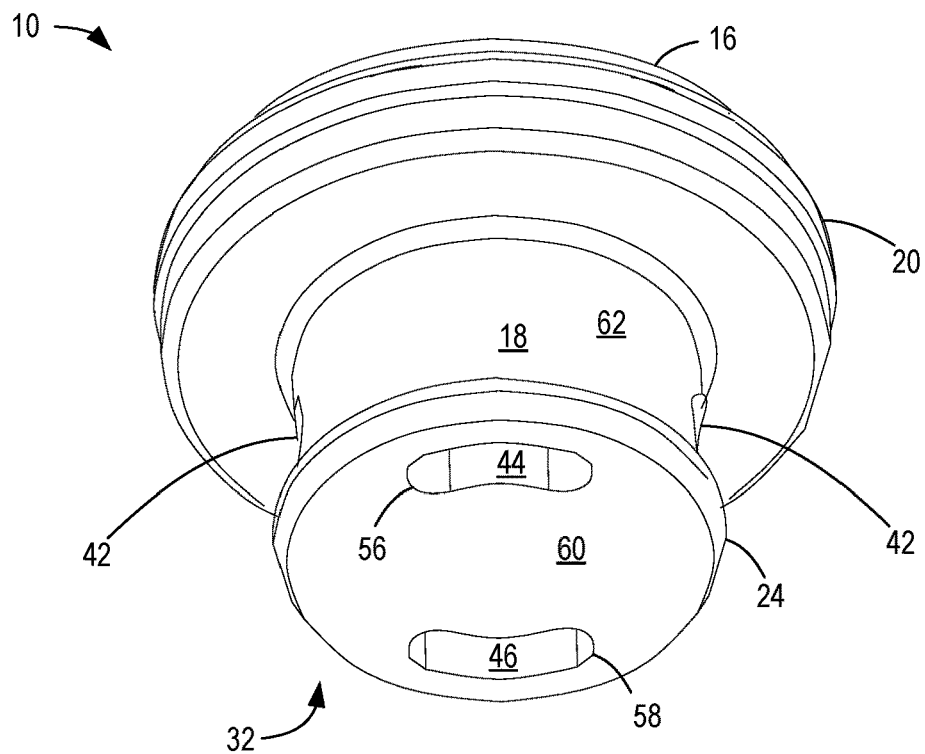
FIG. 3 shows a second perspective view of a valve orifice insert of FIG. 1 in accordance with the first example of the present disclosure.

Referring to FIG. 3, the valve orifice insert 10 according to the first example of the present disclosure is illustrated in a perspective view of the second end 32 of the valve orifice insert 10 showing a first inlet 56 to the first side flow passage 44 and a second inlet 58 to the second side flow passage 46 as viewed on a distal surface 60 of the second tubular section 18. The transverse flow passage 42 extending radially within the second tubular section 18 is shown on the side wall 62 of the second tubular section 18. In this view, the transverse flow passage 42 runs perpendicularly to the first side flow passage 44 and the second side flow passage 46. The outer surface of the second tubular section 18 is also cylindrical or conical. The outer surfaces of the first tubular section 16 and the second tubular section 18 are concentric to each other.

Figure 4:
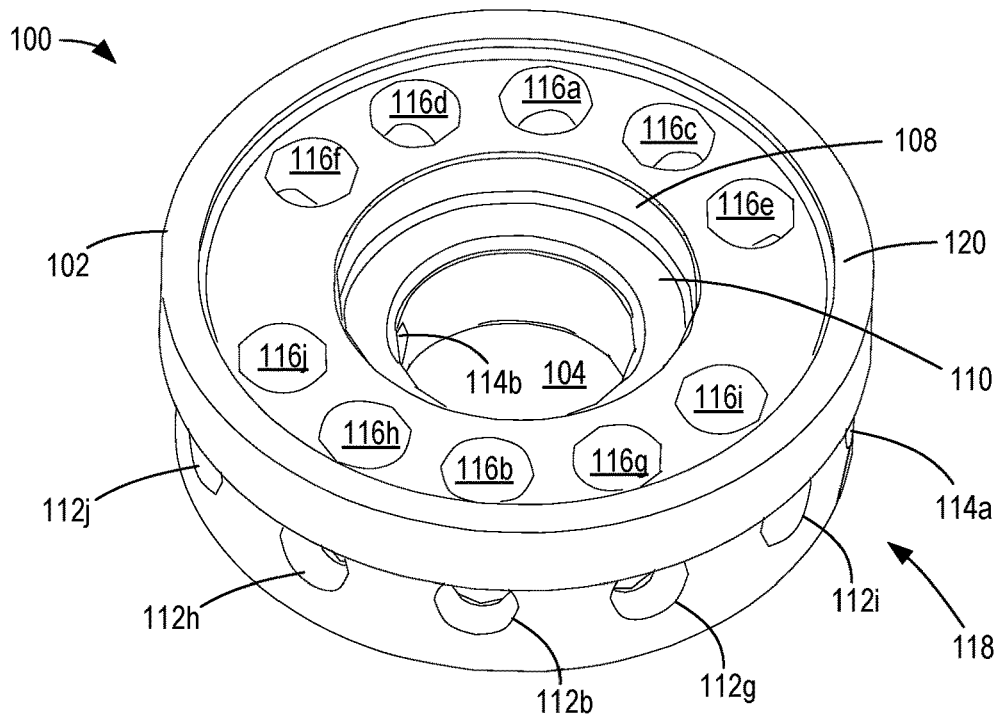
FIG. 4 shows a first perspective view of an orifice structure of a valve assembly of FIG. 1 in accordance with the first example of the present disclosure.

Referring to FIG. 4, a perspective view is shown of the orifice structure 102 of the valve assembly 100 showing the stepped surface 110 of the step-shaped opening 104 and the upper surface 120 of the orifice structure 102. The upper surface 120 forms an annular surface around the edge of the orifice structure 102. The first orifice flow passage 116a and the second orifice flow passage 116b are two of a plurality of orifice flow passages 116a-j. Likewise, the first outlet 112a and the second outlet 112b are two of a plurality of outlets 112a-j. A first transverse outlet 114a and a second transverse outlet 114b provided on a side wall 118 of the orifice structure 102 and configured to communicate with the transverse flow passage 42 when the valve orifice insert 10 is fully inserted into the orifice structure 102.

Figure 5:
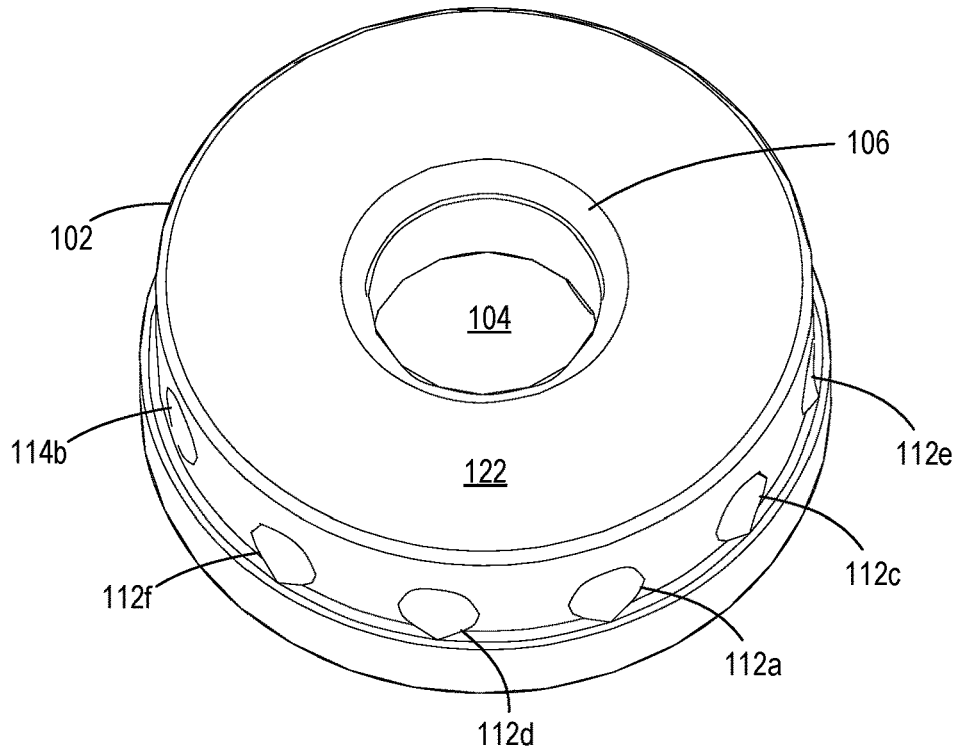
FIG. 5 shows a second perspective view of an orifice structure of a valve assembly of FIG. 1 in accordance with the first example of the present disclosure.

Referring to FIG. 5, a perspective view is shown of the orifice structure 102 of the valve assembly 100 showing the tapered surface 106 of the step-shaped opening 104 and a bottom surface 122 of the orifice structure 102. The tapered surface 106 forms an annular surface around the step-shaped opening 104. The first outlet 112a is show in the view of FIG. 5.

Figure 6:
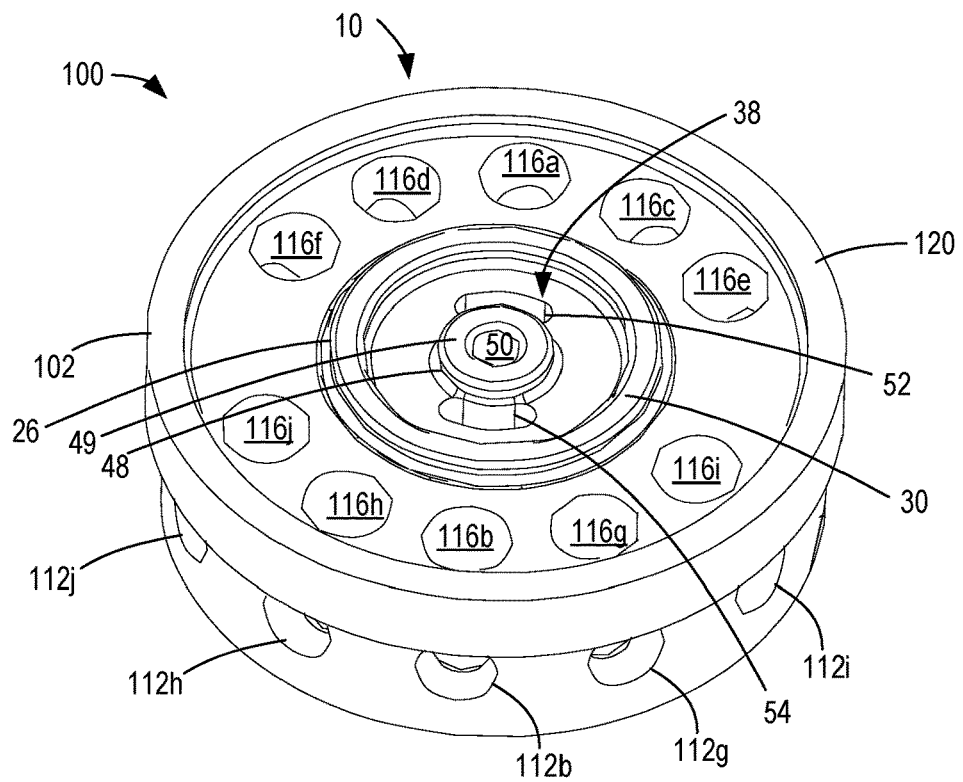
FIG. 6 shows a first perspective view of a valve orifice insert fitted into an orifice structure of a valve assembly of FIG. 1 in accordance with the first example of the present disclosure.

Referring to FIG. 6, a perspective view is shown of the valve orifice insert 10 fully inserted into the step-shaped opening 104 of the orifice structure 102 of the valve assembly 100 so that the planar valve seat surface 30 formed at a distal end of the lip structure 26 is coplanar with an upper surface 120 of the orifice structure 102. It will be appreciated that, in the process of manufacturing the valve assembly 100 with the valve orifice insert 10 fully inserted, the lip structure 26 of the tubular plastic valve insert 10 and the upper surface 120 of the orifice structure 102 of the valve assembly 100 are concurrently lapped with a planar lapping tool so as to form a valve sealing surface 30 on the lip structure 26 and a central planar valve seat surface 49 on the central structure 48 that are coplanar with the upper surface 120 of the orifice structure 102 of the valve assembly 100. The coplanarity of the planar valve seat surface 30 and the central planar valve seat surface 49 with the surface of the orifice structure 102 allows for fine control of the flow of fluid through the orifice structure 102 at a relatively small commanded flow rate.

Figure 7:
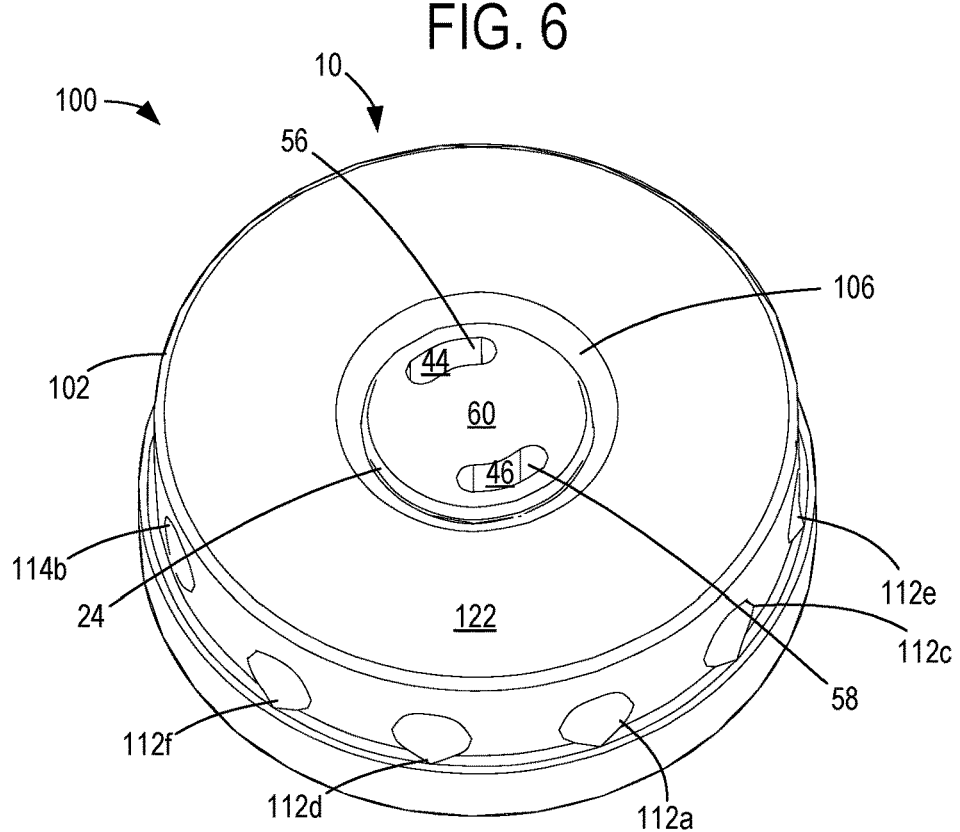
FIG. 7 shows a second perspective view of a valve orifice insert fitted into an orifice structure of a valve assembly of FIG. 1 in accordance with the first example of the present disclosure.

Referring to FIG. 7, a perspective view is shown of the valve orifice insert 10 fully inserted into the step-shaped opening 104 of the orifice structure 102 of the valve assembly 100 so that the second circumferential protrusion 24 springs out and contacts the tapered surface 106, thereby producing a seal and locking action. A first inlet 56 to the first side flow passage 44 and a second inlet 58 to the second side flow passage 46 are on the distal surface 60 of the second tubular section 18.

Figure 8:
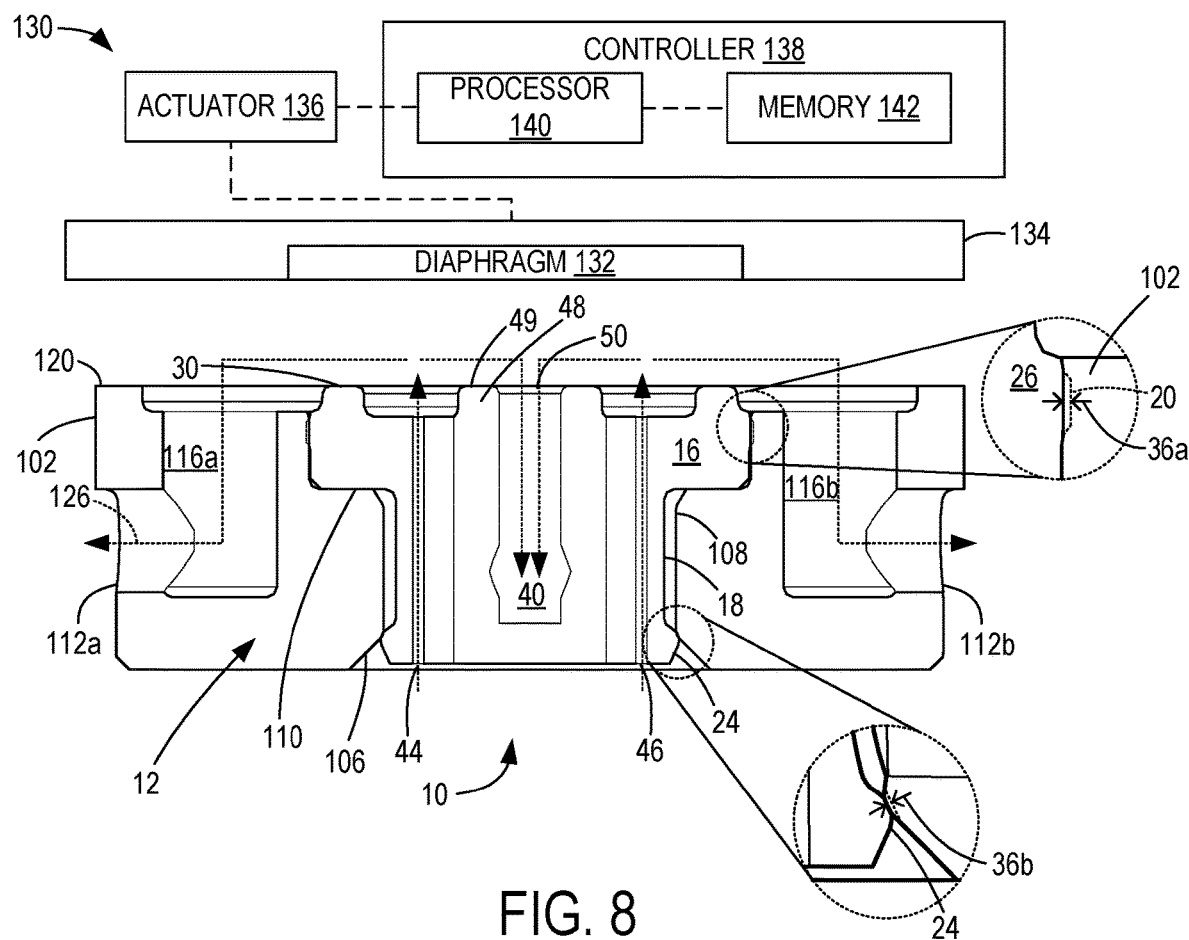
FIG. 8 shows a sectional view of a fluid flow controller incorporating the valve orifice insert and an orifice structure of a valve assembly of FIG. 1 in accordance with the first example of the present disclosure.

Referring to FIG. 8, a sectional view is shown of a fluid flow controller 130 incorporating the valve orifice insert 10 and the valve assembly 100 of the first example according to one example of the present disclosure. The fluid flow controller 130 comprises a flow path 126 and a valve assembly 100 provided in the flow path 126 to control the flow of fluid along the flow path 126. The valve orifice insert 10 and the valve assembly 100 depicted in FIG. 8 are substantially similar to the examples of FIGS. 1-7. The valve assembly 100 includes a first outlet 112a, a second outlet 112b, an actuator 136, and a diaphragm 132 coupled to the actuator 136. An orifice structure 102 of the valve assembly 100 has a valve orifice insert 10 positioned in a step-shaped opening 104 of the valve assembly 100. The actuator 136 is configured to move the diaphragm 132 under command of a controller 138 operatively coupled to the actuator 136 to cause the diaphragm 132 to selectively contact or separate from a planar valve seat surface 30 by a distance to stop or allow the flow of fluid through the orifice structure 102 at a commanded flow rate, which may be in a range of sub sccm from 0.05 to 1 sccm, for example.

For example, when the diaphragm 132 is in a closed position contacting the planar valve seat surface 30, the fluid reaching the outer surface of the first tubular section 16 from the first side flow passage 44 and the second side flow passage 46 is trapped within the recessed cavity 38. However, as the diaphragm 132 lifts away from the planar valve seat surface 30, the fluid trapped within the recessed cavity 38 starts flowing into the first orifice flow passage 116a, the second orifice flow passage 116b, and enter through the central opening 50 of the axially protruding central structure 48 into the central flow passage 40. Because the central planar valve seat surface 49 of the central structure 48, the planar valve seat surface 30 of the lip structure 26, and the upper surface 120 of the orifice structure 102 are all coplanar to each other, the flow of fluid from the recessed cavity 38 into the orifice flow passages 116a, 116b and the central flow passage 40 can be finely regulated by the actuator 136 operatively coupled to the diaphragm 132.

The controller 138 includes a processor 140 and memory 142 that is operatively coupled to the processor 140. The processor 140 sends driving signals to the actuator 136 to move the diaphragm 132 to selectively contact or separate from the planar valve seat surface 30 and the central planar valve seat surface 49. When the diaphragm 132 contacts the planar valve seat surface 30 and the central planar valve seat surface 49 to form a seal, the upper surface 120 of the orifice structure 102 aligns with a mounting structure 134 supporting the diaphragm 132. In this example, the processor 140 and the memory 142 are physically integrated into the controller 138. Alternatively, the processor 140 and/or the memory 142 may be included in a separate physical computing device configured to communicate with the actuator 136 via wired and/or wireless signals. The functions of the processor 140 and the memory 142 may, in some examples, be distributed between a plurality of communicatively coupled computing devices, which may include one or more client computing devices and/or one or more server computing devices.

The valve orifice insert 10 includes plastic tubular body 12 having an outer surface 34. A first circumferential protrusion 20 extends radially outward from the outer surface 34 of the first tubular section 16 to form an interference fit with a side wall 108 of the step-shaped opening 104, and a second circumferential protrusion 24 forms an interference fit with a tapered surface 106 of the orifice structure 102, thereby effecting a seal, so that fluid within the valve orifice insert 10 does not leak out and become entrapped in the spaces between the outer surface 34 of the plastic tubular body 12 and the orifice structure 102. The lip structure 26 includes the planar valve seat surface 30 formed at a distal end of the lip structure 26 that is coplanar with the central planar valve seat surface 49 of the central structure 48 and an upper surface 120 of the orifice structure 102 that supports a mounting structure 134 of the diaphragm 132. The coplanarity of the planar valve seat surface 30 with the central planar valve seat surface 49 of the central structure 48 and the upper surface 120 of the orifice structure 102 allows for fine control of the flow of fluid through the orifice structure 102 at a relatively small commanded flow rate, which may be as small as 0.05 to 1 sccm, for example.

Figure 9:
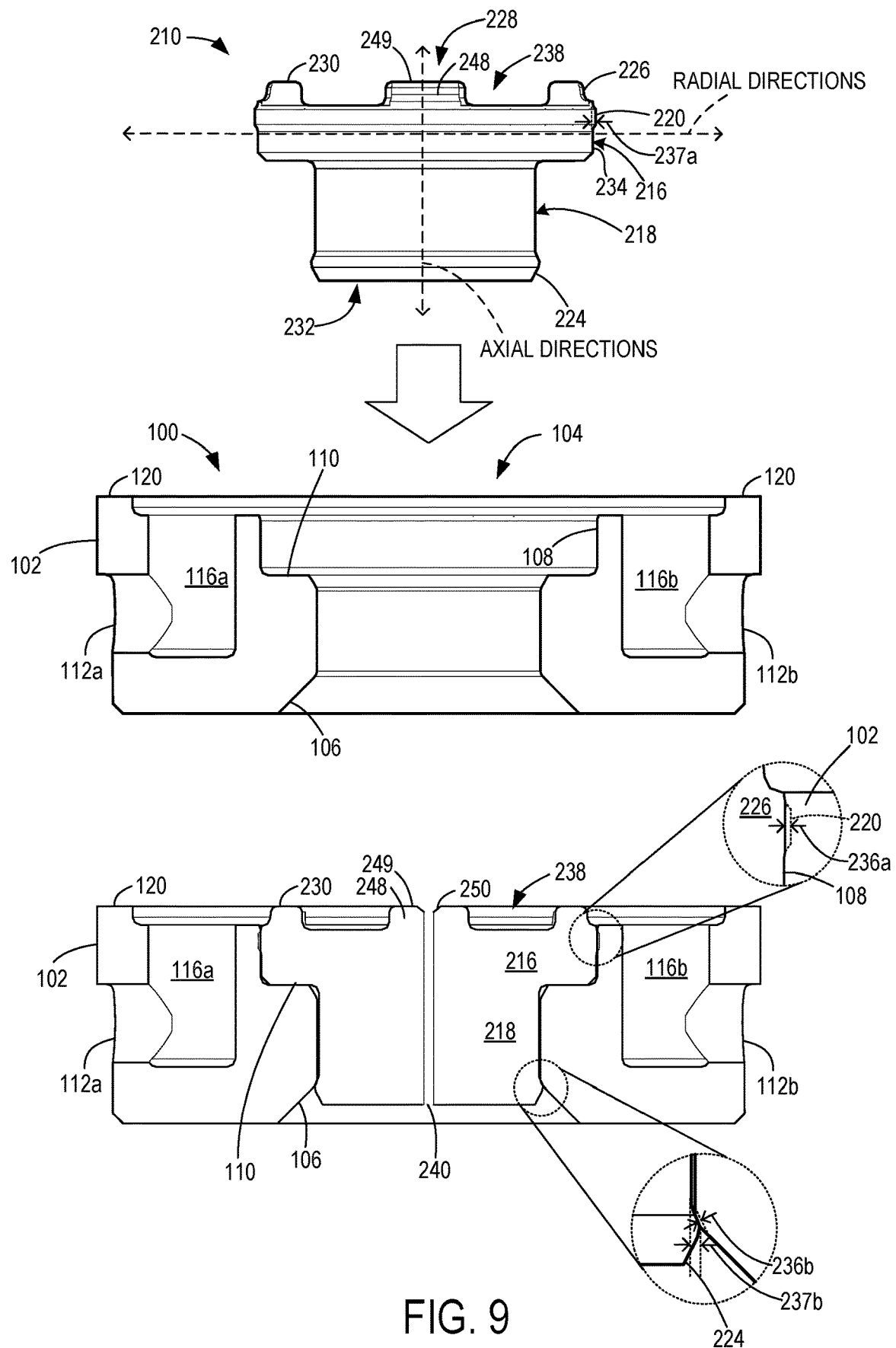
FIG. 9 shows a sectional view of a valve orifice insert fitted into an orifice structure of a valve assembly in accordance with a second example of the present disclosure.

With reference now to FIG. 9, a valve orifice insert 210 according to a second example of the present disclosure is illustrated. As the configuration of the valve orifice insert 210 of the second example is substantially similar to the configuration of the valve orifice insert 10 of the first example, the detailed description thereof is abbreviated here for the sake of brevity. It is to be noted that like parts are designated by like reference numerals throughout the detailed description and the accompanying drawings.

FIG. 9 shows the valve orifice insert 210 being inserted into the step-shaped opening 104 of the orifice structure 102 such that after insertion, at least the first circumferential protrusion 220 extends radially outward a first predetermined distance 237a from an outer surface 234 of the first tubular section 216 to form an interference fit with a side wall 108 of the step-shaped opening 104, and the second circumferential protrusion 224 extends radially outward a second predetermined distance 237b from an outer surface of the second tubular section 218 to form an interference fit with the tapered surface 106 of the step-shaped opening 104. A first interference distance 236a of the interference fit between the first circumferential protrusion 220 and the step-shaped opening 104 and a second interference distance 236b of the interference fit between the second circumferential protrusion 224 and the step-shaped opening 104 may be 1/10000 to 1/100 of an inch, for example. As discussed above, interference distance refers to the difference in the outer and inner diameters of the valve orifice insert and the step-shaped orifice, prior to insertion.

The first tubular section 216 includes an alignment structure 226 protruding axially from a first end 228 of the first tubular section 216 and includes an alignment surface 230 formed at a distal end of the alignment structure 226 and a central planar valve seat surface 249 formed at a distal end of the central structure 248. After insertion, the first tubular section 216 rests on the stepped surface 110 of the step-shaped opening 104, and the alignment surface 230 formed at the distal end of the alignment structure 226 and the central planar valve seat surface 249 formed at the distal end of the central structure 248 are coplanar with an upper surface 120 of the orifice structure 102.

A central structure 248 axially protrudes from the center of the first tubular section 216. A central opening 250 is provided at the center of the central structure 248 for a central flow passage 240 extending radially within the valve orifice insert 210. In the second example, the central flow passage 240 is narrower than the central flow passage 40 of the valve orifice insert 10 of the first example. Unlike the first example, the valve orifice insert 210 of the second example lacks side flow passages that flow parallel to the central flow passage 240.

Figure 10:
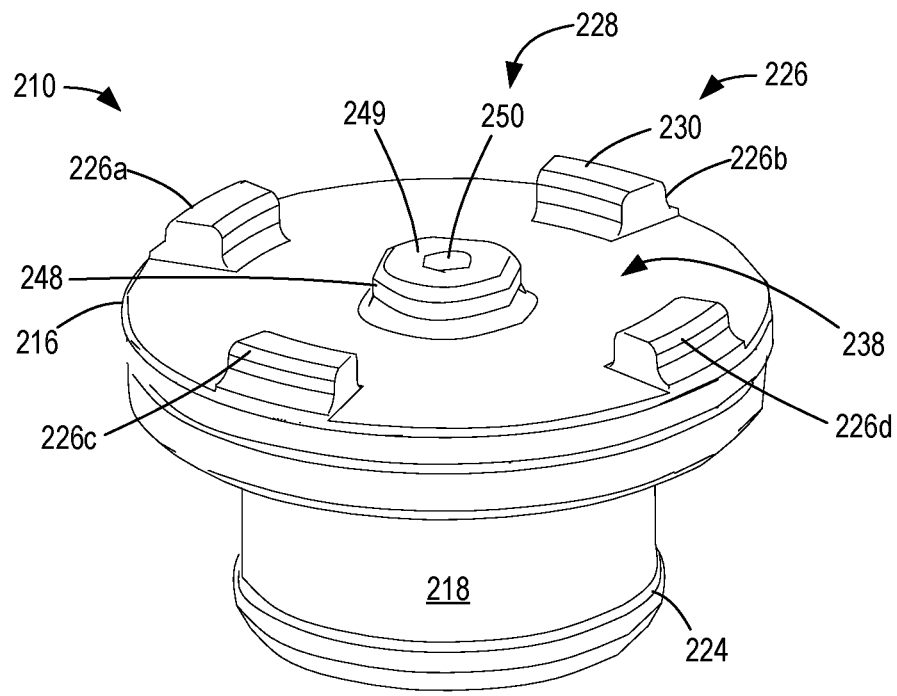
FIG. 10 shows a first perspective view of the valve orifice insert of FIG. 9 in accordance with the second example of the present disclosure.

With reference now to FIG. 10, the valve orifice insert 210 according to the second example of the present disclosure is illustrated in a perspective view showing the first end 228 of the valve orifice insert 210 and the distal end of the alignment structure 226 of the first tubular section 216. In the second example, the alignment structure 226 comprises four separate alignment structures 226a-d protruding from the surface of the first end 228 of the first tubular section 216, each separate alignment structure 226a-d forming an alignment surface 230 at a distal end of each separate alignment structure 226a-d. However, it will be appreciated that the number of alignment structures 226a-d is not particularly limited to four, and may number two, three, or more than four in alternative embodiments. The space between the separate alignment structures 226a-d and the central structure 248 forms a recessed cavity 238, which has no side openings in the second example. It will be appreciated that, when the valve orifice insert 210 is inserted into the orifice structure 102 of the valve assembly 100, the upper surface 120 of the orifice structure 102 will be coplanar with the alignment surface 230 at the distal end of each separate alignment structure 226a-d and the central planar valve seat surface 249 at the distal end of the central structure 248.

Figure 11:
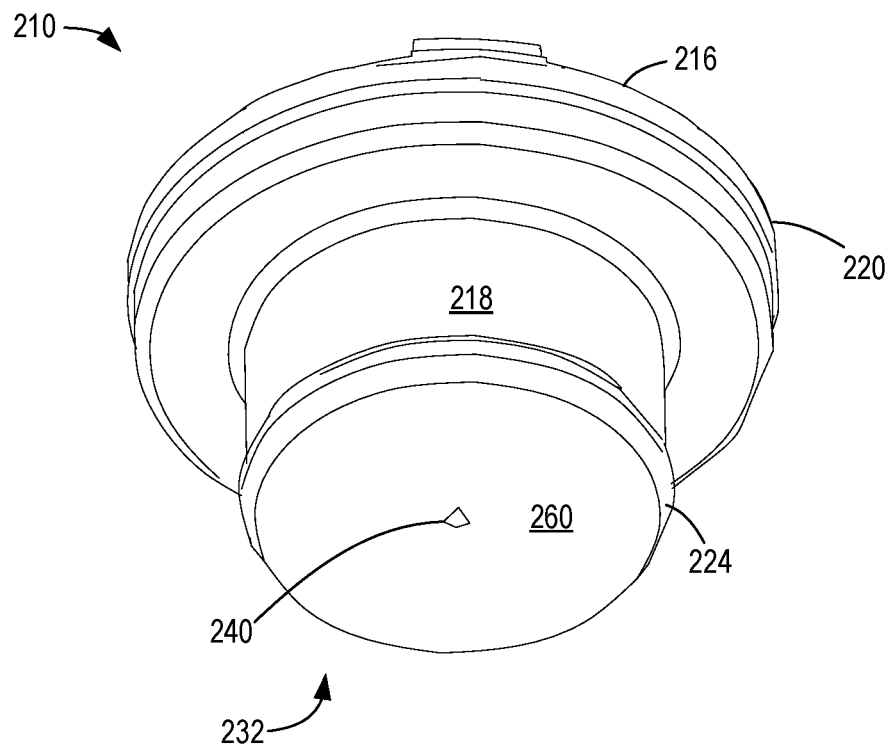
FIG. 11 shows a second perspective view of the valve orifice insert of FIG. 9 in accordance with the second example of the present disclosure.

With reference now to FIG. 11, the valve orifice insert 210 according to the second example of the present disclosure is illustrated in a perspective view showing the second end 232 of the valve orifice insert 210 showing an opening to the central flow passage 240 on a distal surface 260 of the second tubular section 218. Unlike the first example, the distal surface 260 of the valve orifice insert 210 of the second example has no side openings to side flow passages.

Figure 12:
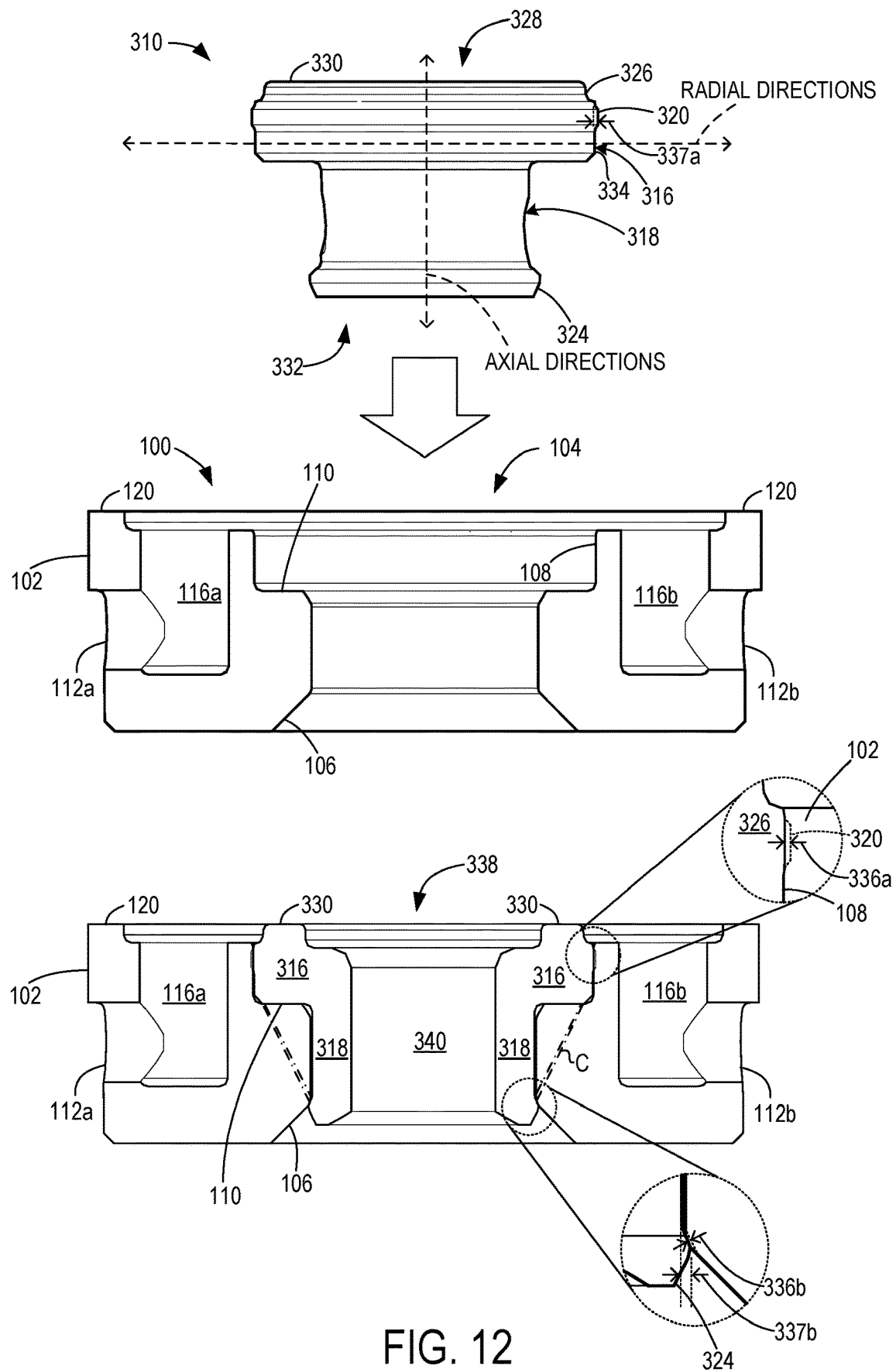
FIG. 12 shows a sectional view of a valve orifice insert fitted into an orifice structure of a valve assembly in accordance with a third example of the present disclosure.

Referring to FIG. 12, a valve orifice insert 310 according to a third example of the present disclosure is illustrated. As the configuration of the valve orifice insert 310 of the third example is substantially similar to the configuration of the valve orifice insert 210 of the second example, the detailed description thereof is abbreviated here for the sake of brevity. It is to be noted that like parts are designated by like reference numerals throughout the detailed description and the accompanying drawings.

FIG. 12 shows the valve orifice insert 310 being inserted into the step-shaped opening 104 of the orifice structure 102 such that after insertion, at least the first circumferential protrusion 320 extends radially outward a first predetermined distance 337a from an outer surface of the first tubular section 316, and the second circumferential protrusion 324 extends radially outward a second predetermined distance 337b from an outer surface of the second tubular section 318 to form an interference fit with the tapered surface 106 of the step-shaped opening 104.

The first tubular section 316 includes a lip structure 326 protruding axially from a first end 328 of the first tubular section 316 and includes a planar valve seat surface 330 formed at a distal end of the lip structure 326. After insertion, the first tubular section 316 rests on the stepped surface 110 of the step-shaped opening 104, and the planar valve seat surface 330 formed at a distal end of the lip structure 326 is coplanar with an upper surface 120 of the orifice structure 102.

Unlike the first example, the valve orifice insert 310 of the third example lacks a central structure or side flow passages. Instead, the space encircled by the lip structure 326 forms a recessed cavity 338 which opens into the central flow passage 340 extending axially within the valve orifice insert 310, forming an inner surface of the first tubular section 316 and an inner surface of the second tubular section 318 which are cylindrical or conical and are concentric.

Figure 13:
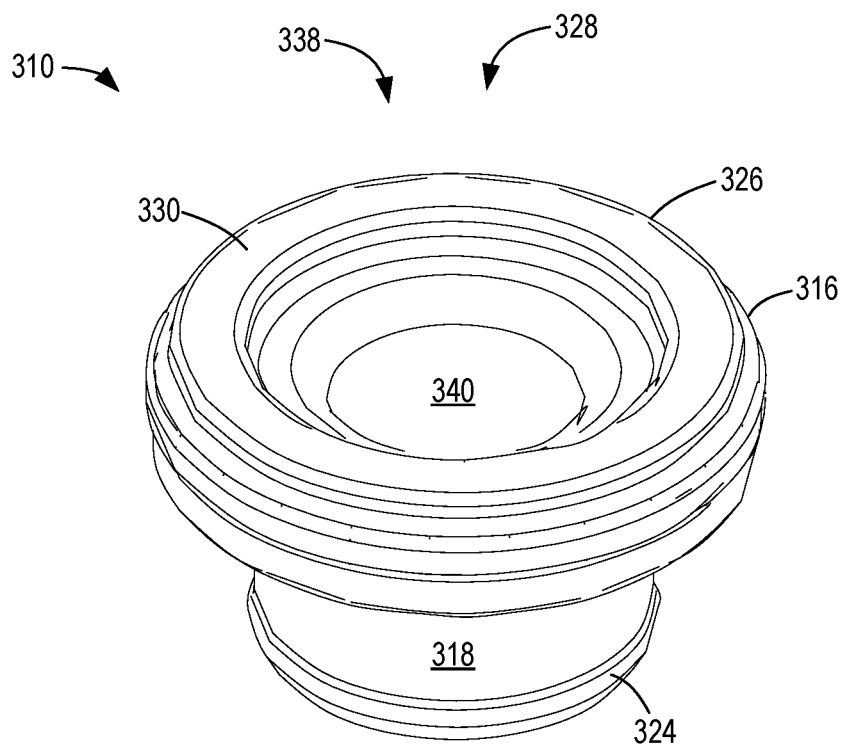
FIG. 13 shows a first perspective view of the valve orifice insert of FIG. 12 in accordance with the third example of the present disclosure.

With reference now to FIG. 13, the valve orifice insert 310 according to the third example of the present disclosure is illustrated in a perspective view showing the first end 328 of the valve orifice insert 310 and the distal end of the lip structure 326 of the first tubular section 316. In the third example, the lip structure 326 forms a protruded ring surrounding the recessed cavity 338. A ring-shaped planar valve seat surface 330 is formed at a distal end of the lip structure 326.

Figure 14:
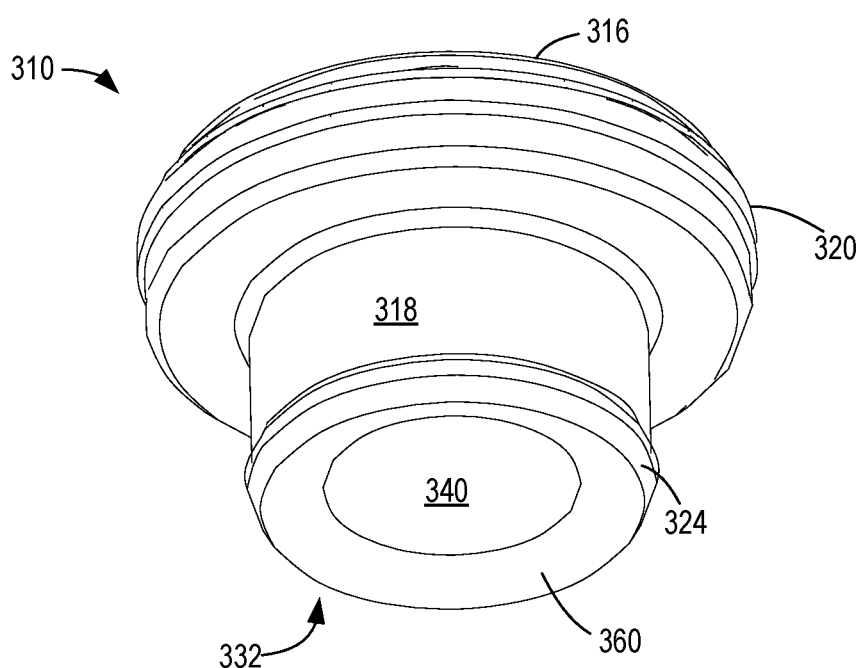
FIG. 14 shows a second perspective view of the valve orifice insert of FIG. 12 in accordance with the third example of the present disclosure.

With reference now to FIG. 14, the valve orifice insert 310 according to the third example of the present disclosure is illustrated in a perspective view showing the second end 332 of the valve orifice insert 310. Unlike the first example, the distal surface 360 of the valve orifice insert 310 of the third example has no side openings to side flow passages. Instead, the space encircled by the second circumferential protrusion 324 forms one opening to the central flow passage 340.

Figure 15:
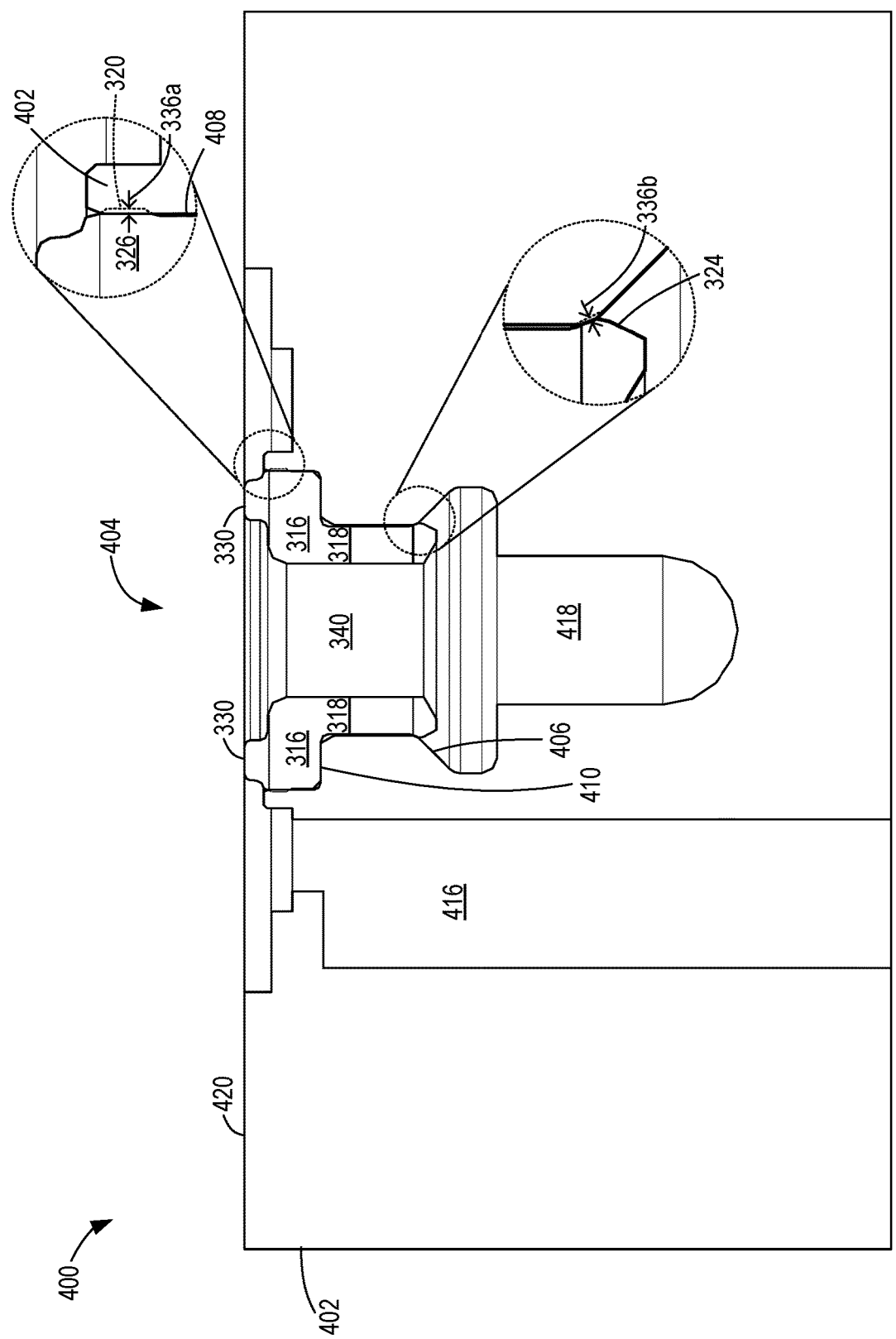
FIG. 15 shows a sectional view of a valve orifice insert of FIG. 12 fitted into a valve body of a valve assembly in accordance with the third example of the present disclosure.

Referring to FIG. 15, a cross-sectional view is shown of the valve orifice insert 310 of the third example fully inserted into a step-shaped opening 404 of an orifice structure 402 of a valve assembly 400, where the orifice structure 402 is a valve block. At least the first circumferential protrusion 320 extends radially outward a first predetermined distance 337a from an outer surface 334 of the first tubular section 316 to form an interference fit with a side wall 408 of the step-shaped opening 404, and the second circumferential protrusion 324 extends radially outward a second predetermined distance 337b from an outer surface of the second tubular section 318 to form an interference fit with the tapered surface 406 of the step-shaped opening 404. A first interference distance 336a of the interference fit between the first circumferential protrusion 320 and the side wall 408 and a second interference distance 336b of the interference fit between the second circumferential protrusion 324 and the tapered surface 406 may be 1/10000 to 1/100 of an inch, for example. As discussed above, interference distance refers to the difference in the outer and inner diameters of the valve orifice insert and the step-shaped orifice, prior to insertion.

In this example, the orifice structure 402 includes a first orifice flow passage 416 and a second orifice flow passage 418 which fluidically communicate with the central flow passage 340. After insertion, the first tubular section 316 rests on the stepped surface 410 of the step-shaped opening 404, and the planar valve seat surface 330 formed at a distal end of the lip structure 326 is coplanar with an upper surface 420 of the orifice structure 402.

Figure 16:
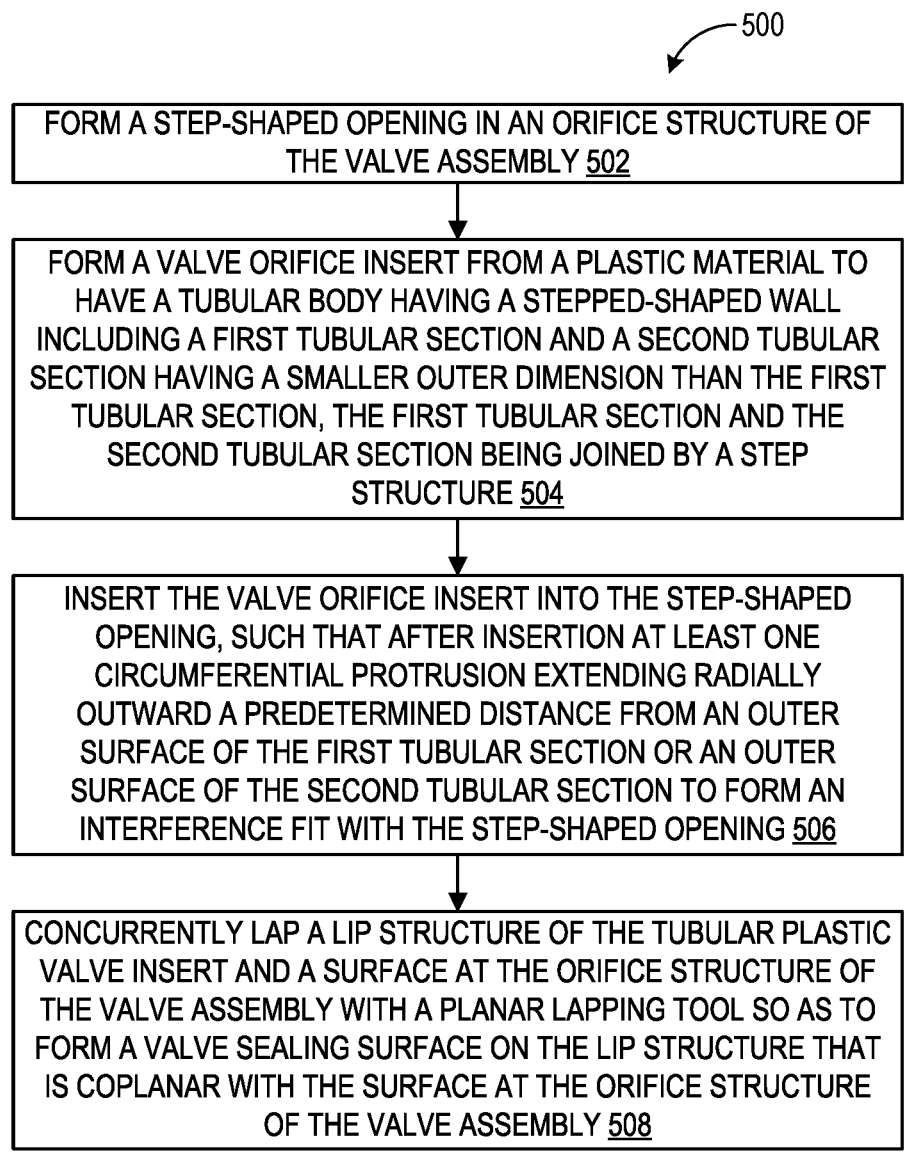
FIG. 16 shows a method for manufacturing a valve assembly in which a valve orifice insert of FIG. 1, FIG. 9.

Referring to FIG. 16, a method 500 is described for manufacturing a valve assembly. The following description of the method 500 is provided with reference to the software and hardware components described above and shown in FIGS. 1-15. It will be appreciated that the method 500 also may be performed in other contexts using other suitable hardware and software components.

At step 502, a step-shaped opening is formed in an orifice structure of the valve assembly. At step 504, a valve orifice insert is formed from a plastic material to have a tubular body having a stepped-shaped wall including a first tubular section and a second tubular section having a smaller outer dimension than the first tubular section, the first tubular section and the second tubular section being joined by a step structure. At step 506, the valve orifice insert is inserted into the step-shaped opening, such that after insertion at least one circumferential protrusion extending radially outward a predetermined distance from an outer surface of the first tubular section or an outer surface of the second tubular section to form an interference fit with the step-shaped opening. The insertion of the valve orifice insert may be stopped at a predetermined depth by the step structure.

At step 508, a lip structure of the tubular plastic valve insert and a surface at the orifice structure of the valve assembly are concurrently lapped with a planar lapping tool so as to form a valve sealing surface on the lip structure that is coplanar with the surface at the orifice structure of the valve assembly. The lip structure protrudes axially from a first end of the first tubular section. The lip structure includes a planar valve seat surface formed at a distal end of the lip structure.

The above-described systems and methods may be used to enhance sealing between the orifice and the valve diaphragm, allow the control valve to control to lower flow rates, and extend the effective stroke of the valve by requiring less force to make a seal. As opposed to conventional designs which use a compressive force for sealing with a resin part sandwiched between two metal parts, the present disclosure uses a diametrical interference fit for sealing, resulting in a simpler design with fewer parts. Compared to fits involving a resin part sandwiched between two metal parts, the interference fit also reduces leakage and entrapment of fluids between the valve orifice insert and the orifice structure, which may result in corrosion of the orifice structure and contamination of the fluids flowing within the flow passages of fluid control systems. The compressibility, flexibility, and resilience of the plastic material of the valve orifice insert enhances the interference fit and ensures longevity. The synergistic effect of the two different interference fits ensures that the valve orifice insert resists displacement from the orifice structure more robustly compared to valve designs involving a resin part sandwiched between two metal parts. The coplanarity of the planar valve seat surface with the surface of the orifice structure allows for fine control of the flow of fluid through the orifice structure at a relatively small commanded flow rate. The present disclosure may be applied in many valve designs which regulate fluid flow.

In some embodiments, the methods and processes described herein may be tied to a computing system of one or more computing devices. In particular, such methods and processes may be implemented as a computer-application program or service, an application-programming interface (API), a library, and/or other computer-program product.

Figure 17:
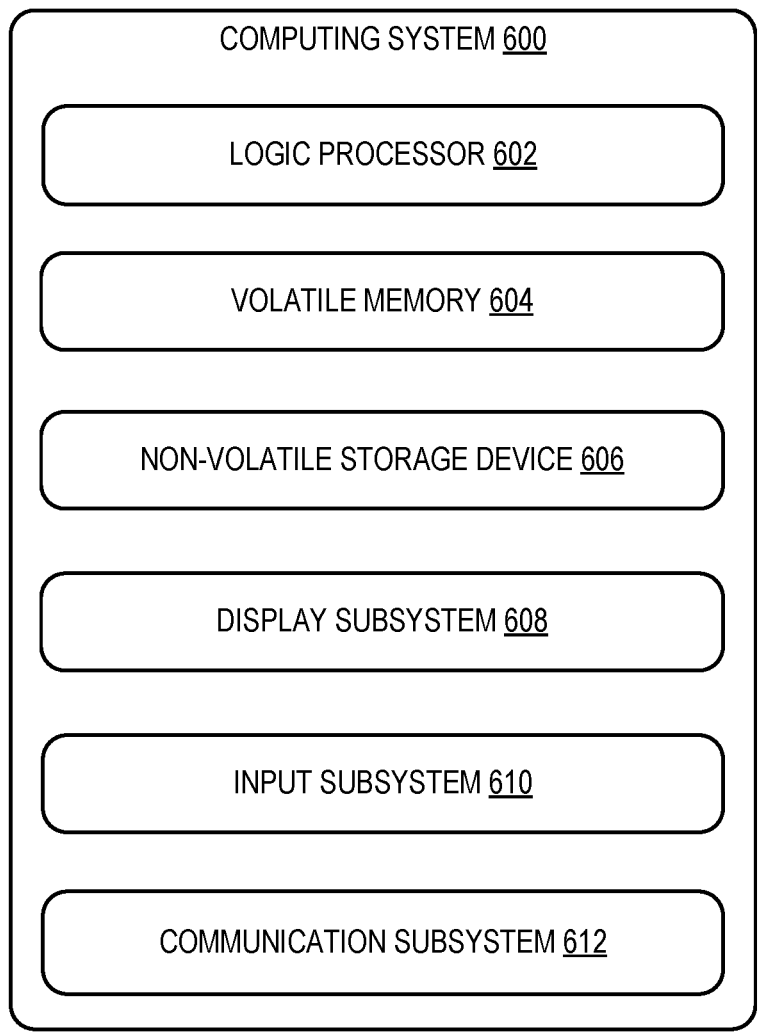
FIG. 17 shows a schematic view of an example computing environment in which the fluid flow controller of FIG. 8 may be enacted.

FIG. 17 schematically shows a non-limiting embodiment of a computing system 600 that can enact one or more of the processes described above. Computing system 600 is shown in simplified form. Computing system 600 may embody the controller 138 described above and illustrated in FIG. 8. Computing system 600 may take the form of one or more personal computers, server computers, network computing devices, mobile computing devices, mobile communication devices (e.g., smart phone), and/or other computing devices, and custom circuit board assemblies.

Computing system 600 includes a logic processor 602 volatile memory 604, and a non-volatile storage device 606. Computing system 600 may optionally include a display subsystem 608, input subsystem 610, communication subsystem 612, and/or other components not shown in FIG. 8.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built-on-volatile storage device 606 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, or touch screen.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 600 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject disclosure includes all novel and non-obvious combinations and subcombinations of the various features and techniques disclosed herein. The various features and techniques disclosed herein are not necessarily required of all examples of the subject disclosure. Furthermore, the various features and techniques disclosed herein may define patentable subject matter apart from the disclosed examples and may find utility in other implementations not expressly disclosed herein.

It will be appreciated that "and/or" as used herein refers to the logical disjunction operation, and thus A and/or B has the following truth table.

| A | B | A and/or B |
|---|---|---|
| T | T | T |
| T | F | T |
| F | T | T |
| F | F | F |

To the extent that terms "includes," "including," "has," "contains," and variants thereof are used herein, such terms are intended to be inclusive in a manner similar to the term "comprises" as an open transition word without precluding any additional or other elements.

The invention claimed is:

1. A valve orifice insert sized to be fitted in a step-shaped opening in an orifice structure of a valve assembly, the valve orifice insert comprising:
    a plastic tubular body having a stepped-shaped wall including a first tubular section and a second tubular section having a smaller outer dimension than the first tubular section, the first tubular section and the second tubular section being joined by a step structure; and a circumferential protrusion extending radially outward a predetermined distance from an outer surface of the second tubular section to form a seal with the step-shaped opening when the valve orifice insert is fitted into the step-shaped opening, wherein the circumferential protrusion is formed adjacent a second end of the plastic tubular body opposite a first end of the plastic tubular body, and the circumferential protrusion has a lobe shape.

2. The valve orifice insert of claim 1, wherein the circumferential protrusion is a second circumferential protrusion, and the valve orifice insert further includes a first circumferential protrusion extending radially outward a predetermined distance from an outer surface of the first tubular section to form an interference fit with the step-shaped opening when the valve orifice insert is fitted into the step-shaped opening, the first circumferential protrusion being formed adjacent the first end of the plastic tubular body.

3. The valve orifice insert of claim 2, wherein the first circumferential protrusion is shaped as a ridge extending radially outward the predetermined distance from the outer surface of the first tubular section.

4. The valve orifice insert of claim 2, wherein the outer surface of the first tubular section and the outer surface of the second tubular section are cylindrical or conical and are concentric; and an inner surface of the first tubular section and an inner surface of the second tubular section are cylindrical or conical and are concentric.

5. The valve orifice insert of claim 2, wherein an interference distance of the interference fit is 1/10000 to 1/100 of an inch.

6. The valve orifice insert of claim 1, further comprising a lip structure protruding axially from a first end of the first tubular section, the lip structure including a planar valve seat surface formed at a distal end thereof.

7. The valve orifice insert of claim 6, wherein the step-shaped opening further has a tapered surface which tapers away from a second end of the valve orifice insert fitted into the step-shaped opening, and the circumferential protrusion contacts at least a portion of the tapered surface.

8. The valve orifice insert of claim 7, wherein the tapered surface faces away from a surface of the step structure.

9. The valve orifice insert of claim 1, wherein the valve orifice insert comprises of an engineered-type plastic.

10. A method for manufacturing a valve assembly, the method comprising:

forming a step-shaped opening in an orifice structure of the valve assembly;

forming a valve orifice insert from a plastic material to have a tubular body having a stepped-shaped wall including a first tubular section and a second tubular section having a smaller outer dimension than the first tubular section, the first tubular section and the second tubular section being joined by a step structure;

inserting the valve orifice insert into the step-shaped opening, such that after insertion a circumferential protrusion extending radially outward a predetermined distance from an outer surface of the first tubular section or an outer surface of the second tubular section forms a seal with the step-shaped opening; and concurrently lapping a lip structure of the tubular plastic valve insert and a surface at the orifice structure of the valve assembly with a planar lapping tool so as to form a valve sealing surface on the lip structure that is coplanar with the surface at the orifice structure of the valve assembly, wherein the lip structure protrudes axially from a first end of the first tubular section, the lip structure including a planar valve seat surface formed at a distal end thereof.

11. The method of claim 10, wherein the insertion of the valve orifice insert is stopped at a predetermined depth by the step structure.

12. The method of claim 11, wherein the circumferential protrusion extends radially outward from the outer surface of the second tubular section, formed adjacent a second end of the plastic tubular body opposite the first end of the plastic tubular body.

13. The method of claim 12, wherein the circumferential protrusion is a second circumferential protrusion, the valve orifice insert is formed to include a first circumferential protrusion extending radially outward from the outer surface of the first tubular section, adjacent the first end of the plastic tubular body, and the first circumferential protrusion forms an interference fit with the step-shaped opening when the valve orifice insert is fitted into the step-shaped opening.

14. The method of claim 12, wherein the outer surface of the first tubular section and the outer surface of the second tubular section are cylindrical or conical and are concentric; and an inner surface of the first tubular section and an inner surface of the second tubular section are cylindrical or conical and are concentric.

15. The method of claim 13, wherein an interference distance of the interference fit is 1/10000 to 1/100 of an inch.

16. The method of claim 10, wherein the step-shaped opening further has a tapered surface which tapers away from a second end of the tubular plastic valve insert fitted into the step-shaped opening, and the circumferential protrusion contacts at least a portion of the tapered surface.

17. The method of claim 10, wherein the tubular plastic valve insert comprises engineered-type plastic.

18. A fluid flow controller comprising:

a flow path;

a valve assembly provided in the flow path to control the flow of fluid along the flow path, the valve including an inlet, an outlet, an orifice structure having a valve orifice insert positioned in an opening thereof, the valve orifice insert fluidically communicating with the inlet and outlet, and a diaphragm coupled to an actuator, the actuator being configured to move the diaphragm under command of a controller to cause the diaphragm to selectively contact or separate from a planar valve seat surface by a distance to stop or allow the flow of fluid through the orifice structure at a commanded flow rate, wherein the valve orifice insert includes a plastic tubular body having an outer surface, at least one circumferential protrusion extending radially outward from the outer surface forming an interference fit with a wall of the opening, and a lip structure including the planar valve seat surface formed at a distal end thereof that is coplanar with a surface of the orifice structure that supports an outer circumferential portion of the diaphragm.

19. The fluid flow controller of claim 18, wherein the commanded flow rate is in a range of sub sccm from 0.05 to 1 sccm.

* * * * *